(12) United States Patent
Asanuma

(10) Patent No.: US 11,248,543 B2
(45) Date of Patent: Feb. 15, 2022

(54) VAPORIZED-FUEL TREATING APPARATUS

(71) Applicant: AISAN KOGYO KABUSHIKI KAISHA, Obu (JP)

(72) Inventor: Daisaku Asanuma, Gamagori (JP)

(73) Assignee: AISAN KOGYO KABUSHIKI KAISHA, Obu (JP)

( * ) Notice: Subject to any disclaimer, the term of this patent is extended or adjusted under 35 U.S.C. 154(b) by 254 days.

(21) Appl. No.: 16/460,225

(22) Filed: Jul. 2, 2019

(65) Prior Publication Data
US 2020/0032724 A1    Jan. 30, 2020

(30) Foreign Application Priority Data

Jul. 27, 2018   (JP) .............................. JP2018-141770

(51) Int. Cl.
*F02D 41/00* (2006.01)
*F02D 41/40* (2006.01)
(Continued)

(52) U.S. Cl.
CPC ..... *F02D 41/0032* (2013.01); *F02D 41/0002* (2013.01); *F02D 41/0042* (2013.01);
(Continued)

(58) Field of Classification Search
CPC ...... B60K 6/24; B60W 20/00; B60Y 2200/92; F02D 41/0002; F02D 41/0032;
(Continued)

(56) References Cited

U.S. PATENT DOCUMENTS

| 4,116,184 A | 9/1978 | Tomita |
| 10,408,143 B2 * | 9/2019 | Dudar ................. F01M 13/022 |

(Continued)

FOREIGN PATENT DOCUMENTS

| JP | S59-192858 A | 11/1984 |
| JP | 2002-349366 A | 12/2002 |

(Continued)

OTHER PUBLICATIONS

Apr. 2, 2021 Office Action issued in Chinese Patent Application No. 201910681265.5.

(Continued)

*Primary Examiner* — Hung Q Nguyen
*Assistant Examiner* — Mark L. Greene
(74) *Attorney, Agent, or Firm* — Oliff PLC

(57) ABSTRACT

A vaporized-fuel treating apparatus is configured to perform purge control in which a purge valve is placed in an open state while a purge pump is being driven to introduce purge gas from a canister to an intake passage through a purge passage. When an actual value of a flow rate of the purge gas during execution of the purge control is defined as an actual purge flow rate, and an upper-limit value of the purge flow rate to prevent the occurrence of A/F disturbance where A/F in a combustion chamber of an engine excessively fluctuates, as an upper-limit purge flow rate, the number of rotations of the purge pump is controlled during execution of the purge control to adjust the actual purge flow rate to a value equal to or lower than the upper-limit purge flow rate.

4 Claims, 14 Drawing Sheets

(51) Int. Cl.
    *B60K 6/24*     (2007.10)
    *B60W 20/00*    (2016.01)
(52) U.S. Cl.
    CPC ......... *F02D 41/0045* (2013.01); *F02D 41/40* (2013.01); *B60K 6/24* (2013.01); *B60W 20/00* (2013.01); *B60Y 2200/92* (2013.01)
(58) Field of Classification Search
    CPC ..... F02D 41/0042; F02D 41/003–0045; F02D 41/40; F02M 25/08–089; F02M 2025/0845–0881
    See application file for complete search history.

(56)           References Cited

U.S. PATENT DOCUMENTS

2002/0174856 A1    11/2002  Tagami et al.
2017/0089275 A1     3/2017  Ooiwa
2019/0353112 A1*   11/2019  Kim .................... F02D 41/0042

FOREIGN PATENT DOCUMENTS

JP      2007-205231  A     8/2007
JP      2008-240641  A    10/2008
JP      2016-180394  A    10/2016
JP      2017-067008  A     4/2017

OTHER PUBLICATIONS

Aug. 17, 2021 Office Action issued in Japanese Patent Application No. 2018-141770.

\* cited by examiner

FIG. 13

| PURGE A/F | 1 | 3 | 5 | 10 |
|---|---|---|---|---|
| PREDETERMINED TIME (sec) | 3.0 | 2.5 | 1.0 | 0.5 |

FIG. 14

| PURGE STOP TIME (sec) | 1 | 5 | 10 | 20 |
|---|---|---|---|---|
| PREDETERMINED TIME (sec) | 0.5 | 1.0 | 2.5 | 3.0 |

VAPORIZED-FUEL TREATING APPARATUS

CROSS-REFERENCE TO RELATED APPLICATIONS

This application is based upon and claims the benefit of priority from the prior Japanese Patent Application No. 2018-141770 filed on Jul. 27, 2018, the entire contents of which are incorporated herein by reference.

BACKGROUND

Technical Field

The present disclosure relates to a vaporized-fuel treating apparatus for supplying vaporized fuel generated in a fuel tank to an internal combustion engine through an intake passage.

Related Art

As a conventional art, there is known a vaporized-fuel treating apparatus disclosed in Japanese unexamined patent application publication No. 2007-205231 (JP2007-205231A). In this apparatus, when the vaporized fuel in a canister is to be desorbed and supplied to the intake pipe by a purge pump, a purge control valve is controlled under duty control to change a purge flow rate of vaporized fuel to be supplied to an intake pipe.

SUMMARY

Technical Problems in the vaporized-fuel treating apparatus disclosed in JP2007-205231A, it is conceivable that a purge valve (the purge control valve) is constituted of a simple on-off valve having no function of regulating a flow rate for the purpose of simplification of apparatus structure. In this case, however, the flow rate of purge gas (the purge flow rate) could not be regulated accurately, which may cause A/F disturbance, namely, an air-fuel ratio disturbance meaning a phenomenon where an air-fuel ratio in a combustion chamber of an engine excessively fluctuates.

The present disclosure has been made to address the above problems and has a purpose to provide a vaporized-fuel treating apparatus with a simplified apparatus structure capable of preventing the occurrence of A/F disturbance.

Means of Solving the Problems

To achieve the above-mentioned purpose, one aspect of the present disclosure provides a vaporized-fuel treating apparatus to be used in a vehicle configured to obtain driving power for running from an internal combustion engine and a motor, the vaporized-fuel treating apparatus comprising: a canister configured to store vaporized fuel; a purge passage connected to an intake passage and the canister, the intake passage being connected to the internal combustion engine; a purge pump provided in the purge passage; and a purge valve configured to open and close the purge passage, wherein the vaporized-fuel treating apparatus is configured to perform purge control in which the purge valve is placed in an open state while the purge pump is being driven to introduce purge gas containing the vaporized fuel from the canister to the intake passage through the purge passage, and wherein when an actual value of a flow rate of the purge gas during execution of the purge control is defined as an actual purge flow rate, and an upper-limit value of the flow rate of the purge gas to prevent occurrence of air-fuel ratio disturbance where an air-fuel ratio in a combustion chamber of the internal combustion engine excessively fluctuates is defined as an upper-limit purge flow rate, during execution of the purge control, the vaporized-fuel treating apparatus is configured to control a rotation number of the purge pump to adjust the actual purge flow rate to a value equal to or lower than the upper-limit purge flow rate.

The vaporized-fuel treating apparatus configured as above controls the number of rotations of the purge pump to regulate a flow rate of the purge gas. Thus, even when the purge valve is constituted of a simple on-off valve in order to simplify the structure of the vaporized-fuel treating apparatus to be used in a vehicle, such as a hybrid vehicle (HV) and a plug-in hybrid vehicle (PHV), this apparatus can precisely regulate the flow rate of the purge gas, thereby preventing the occurrence of A/F disturbance. Consequently, the vaporized-fuel treating apparatus can be simplified in structure while capable of preventing the A/F disturbance from occurring.

To achieve the foregoing purpose, another aspect of the present disclosure provides a vaporized-fuel treating apparatus to be used in a vehicle configured to obtain driving power for running from an internal combustion engine and a motor, the vaporized-fuel treating apparatus comprising: a canister configured to store vaporized fuel; a purge passage connected to an intake passage and the canister, the intake passage being connected to the internal combustion engine; a purge pump provided in the purge passage; and a purge valve configured to open and close the purge passage, wherein the vaporized-fuel treating apparatus is configured to perform purge control in which the purge valve is placed in an open state while the purge pump is being driven to introduce purge gas containing the vaporized fuel from the canister to the intake passage through the purge passage, wherein during execution of the purge control, the vaporized-fuel treating apparatus is configured to: (i) calculate a request intake amount based on a concentration of the purge gas, the request intake amount corresponding to an intake amount required to prevent occurrence of air-fuel-ratio disturbance where an air-fuel ratio in a combustion chamber of the internal combustion engine excessively fluctuates; and (ii) control at least one of a rotation number of the internal combustion engine and a load ratio of the internal combustion engine to adjust an intake amount to a value equal to or larger than the request intake amount.

The vaporized-fuel treating apparatus configured as above controls the number of rotations of the internal combustion engine and the load factor of the internal combustion engine according to the concentration of purge gas to regulate the amount of intake air. Thus, the air-fuel ratio (A/F) value in the combustion chamber of the internal combustion engine can be adjusted to an optimal value. Accordingly, even when the purge valve is constituted of a simple on-off valve in order to simplify the apparatus structure and therefore the purge valve could not precisely regulate the flow rate of the purge gas, the vaporized-fuel treating apparatus can prevent the occurrence of A/F disturbance. The vaporized-fuel treating apparatus can thus be simplified in structure while capable of preventing the A/F disturbance from occurring.

To achieve the foregoing purpose, still another aspect of the present disclosure provides a vaporized-fuel treating apparatus to be used in a vehicle configured to obtain driving power for running from an internal combustion engine and a motor, the vaporized-fuel treating apparatus comprising: a canister configured to store vaporized fuel; a purge passage connected to an intake passage and the canister, the intake passage being connected to the internal combustion engine; a purge pump provided in the purge passage; and a purge valve configured to open and close the purge passage, wherein the vaporized-fuel treating apparatus is configured to perform purge control in which the purge valve is placed in an open state while the purge pump is being driven to introduce purge gas containing the vaporized fuel from the canister to the intake passage through the purge passage, wherein the vaporized-fuel treating apparatus further includes an intake pressure control valve placed in the intake passage and configured to control an intake pressure corresponding to a pressure in the intake passage, wherein when an actual value of a flow rate of the purge gas during execution of the purge control is defined as an actual purge flow rate, and an upper-limit value of the flow rate of the purge gas to prevent occurrence of air-fuel ratio disturbance where an air-fuel ratio in a combustion chamber of the internal combustion engine excessively fluctuates is defined as an upper-limit purge flow rate, during execution of the purge control, the vaporized-fuel treating apparatus is configured to control an opening degree of the intake pressure control valve to adjust the actual purge flow rate to a value equal to or lower than the upper-limit purge flow rate.

The vaporized-fuel treating apparatus configured as above controls the opening degree of the intake pressure control valve to regulate the intake pressure, thereby regulating the flow rate of the purge gas. Accordingly, even when the purge valve is constituted of a simple on-off valve in order to simplify the structure of the vaporized-fuel treating apparatus to be used in a vehicle, such as a HV and a PHV, this vaporized-fuel treating apparatus can control the opening degree of the intake pressure control valve to precisely regulate the flow rate of the purge gas and prevent the occurrence of A/F disturbance. Consequently, the vaporized-fuel treating apparatus can be simplified in structure while capable of preventing the A/F disturbance from occurring.

According to the vaporized-fuel treating apparatus in the present disclosure, this apparatus can be simplified in structure while capable of preventing the occurrence of A/F disturbance.

BRIEF DESCRIPTION OF THE DRAWINGS

FIG. 13 is a table showing one example of a map defining a relationship between purge A/F and predetermined time;

FIG. 14 is a table showing one example of a map defining a relationship between purge stop time and predetermined time.

DETAILED DESCRIPTION OF THE EXEMPLARY EMBODIMENTS

A detailed description of embodiments of a vaporized-fuel treating apparatus according to this disclosure will now be given referring to the accompanying drawings.

First Embodiment

A first embodiment of the vaporized-fuel treating apparatus will be described below.
<Outline of Vaporized-Fuel Treating Apparatus>

The outline of a vaporized-fuel treating apparatus 1 in the present embodiment will now be described. This vaporized-fuel treating apparatus 1 can be used in a vehicle such as automobile cars, for example, a hybrid vehicle (HV), a plug-in hybrid vehicle (PHV), and other type vehicles, which obtain driving power for running, i.e., run on driving energy from an internal combustion engine and a motor.

Figure 1:
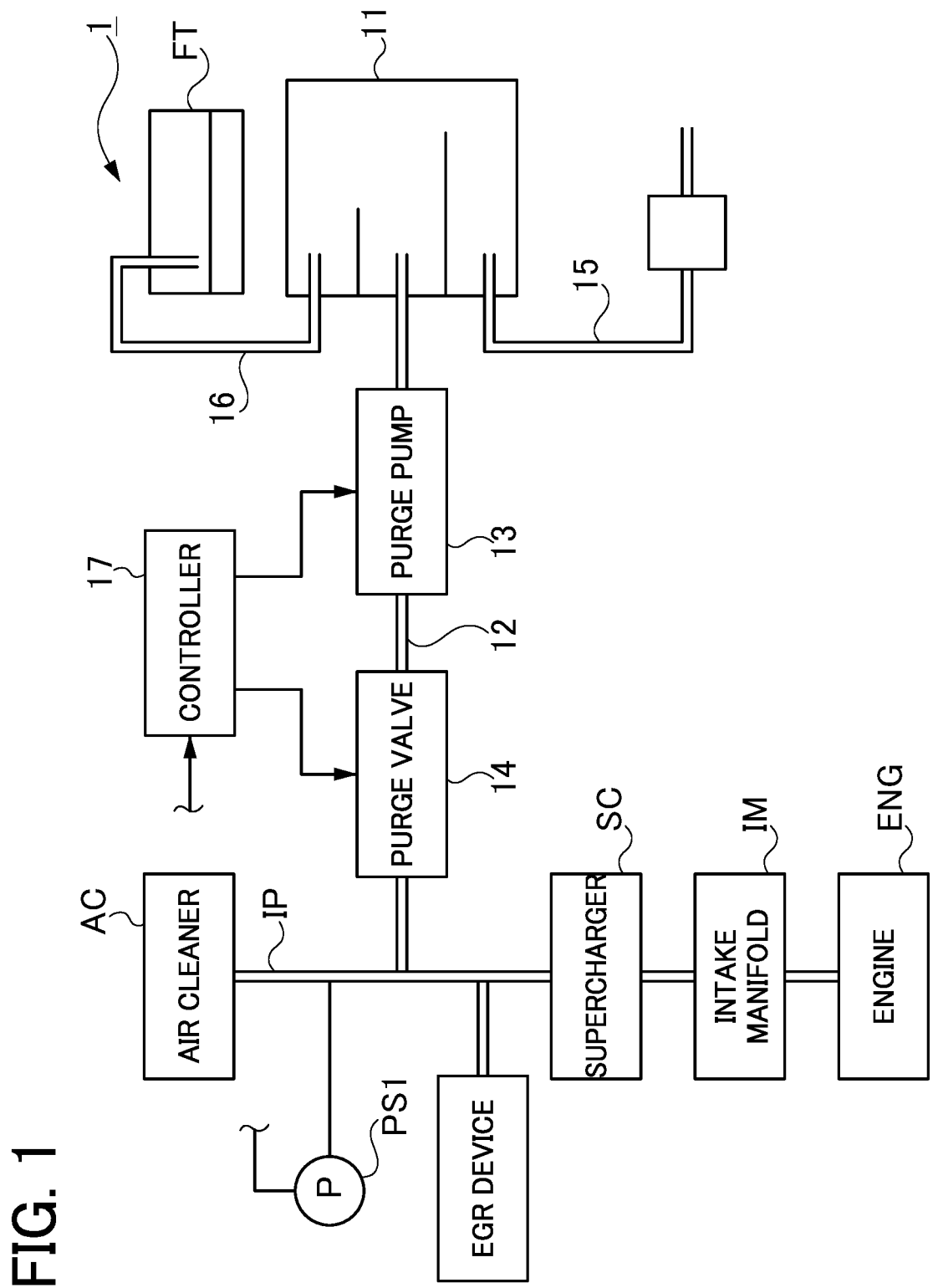
FIG. 1 is a schematic configuration diagram of a vaporized-fuel treating system including a vaporized-fuel treating apparatus in a first embodiment and its peripheral equipment.

Herein, as shown in FIG. 1, an engine ENG (one example of an internal combustion engine) mounted in a vehicle is connected to an intake passage IP to supply air, namely, intake air and suction air, to the engine ENG. On an upstream side in the intake passage IP, that is, an upstream side in an air flowing direction, an air cleaner AC is provided to remove foreign matters from the air flowing in the intake passage IP. Accordingly, in the intake passage IP, the air passes through the air cleaner AC and is sucked into the engine ENG. The engine ENG is provided with an injector (one example of a fuel injection valve) not illustrated to inject fuel into a combustion chamber of the engine ENG. In the intake passage IP, furthermore, a supercharger SC and an intake manifold IM are placed. In the intake passage IP, a pressure sensor PS1 (a pressure detecting part, a first pressure detecting part) is provided downstream of the air cleaner AC, that is, at a position between the air cleaner AC and a joining area of the intake passage IP to a purge passage 12 as mentioned later. The intake passage IP is connected to an EGR apparatus.

The vaporized-fuel treating apparatus 1 in the present embodiment is configured to supply vaporized fuel in a fuel tank FT to the engine ENG through the intake passage IP. The vaporized-fuel treating apparatus 1 includes, as shown in FIG. 1, a canister 11, a purge passage 12, a purge pump 13, a purge valve 14, an atmosphere passage 15, a vapor passage 16, a controller 17, and others. A system including the vaporized-fuel treating apparatus 1, the engine ENG, and peripheral components such as the intake passage IP is hereinafter referred to as a vaporized-fuel treating apparatus system.

The canister 11 is connected to the fuel tank FT through the vapor passage 16 and is configured to store vaporized fuel flowing therein from the fuel tank FT through the vapor passage 16. The canister 11 communicates with the purge passage 12 and the atmosphere passage 15.

The purge passage 12 is connected to the intake passage IP and the canister 11. Thus, purge gas flowing out of the canister 11, i.e., gas containing vaporized fuel, passes through the purge passage 12 and then flows in the intake passage IP. The purge passage 12 may also be connected to the intake passage IP at a position upstream of an electronic throttle (not shown) or alternatively connected to the intake passage IP at a position downstream of the electronic throttle, i.e., on a downstream in an air flowing direction.

The purge pump 13 is provided in the purge passage 12 and configured to control a flow of purge gas flowing through the purge passage 12. Specifically, the purge pump 13 pumps out the purge gas from the canister 11 to the purge passage 12 to supply the purge gas pumped into the purge passage 12 to the intake passage IP.

The purge valve 14 is placed in the purge passage 12 at a position downstream of the purge pump 13, i.e., on a downstream in a purge gas flowing direction, that is, between the purge pump 13 and the intake passage IP. The purge valve 14 is a valve operative to open and close the purge passage 12. During closing of the purge valve 14, i.e., while the purge valve 14 is in a closed state, the purge gas in the purge passage 12 is stopped by the purge valve 14 from flowing toward the intake passage IP. In contrast, during opening of the purge valve 14, i.e., while the purge valve 14 is in an open state, the purge gas is allowed to flow toward the intake passage IP.

In the present embodiment, for simplification of the structure of the vaporized-fuel treating apparatus 1, the purge valve 14 is constituted of a simple on-off valve (e.g., an electromagnetic valve) having no function of controlling a purge flow rate, for example, no function of performing duty control. In other words, the purge valve 14 is an on-off valve configured to selectively come into two states; a fully closed state (corresponding to a state with an opening degree of 0%) and a fully open state (corresponding to a state with an opening degree of 100%). During execution of purge control, this purge valve 14 is placed in an open state, i.e., remains in the fully open state corresponding to a 100% duty ratio. The duty control indicates the control to adjust the duty ratio of a signal outputted to the purge valve 14 to thereby regulate the valve-opening time period. The purge control indicates the control to introduce purge gas from the canister 11 into the intake passage IP through the purge passage 12.

The atmosphere passage 15 has one end that is open to atmosphere and the other end that is connected to the canister 11 to provide communication between the canister 11 and the atmosphere. Thus, air taken from atmosphere flows in the atmosphere passage 15.

The vapor passage 16 is connected to the fuel tank FT and the canister 11. Thus, vaporized fuel in the fuel tank FT is allowed to flow to the canister 11 through the vapor passage 16.

The controller 17 is a part of an ECU (not shown) mounted in a vehicle and is placed integrally with other sections of the ECU, for example, a section for controlling the engine ENG. The controller 17 may also be placed separately from the other sections of the ECU. The controller 17 includes a CPU and memories, such as a ROM and a RAM. The controller 17 is configured to control the vaporized-fuel treating apparatus 1 and the vaporized-fuel treating system according to programs stored in advance in the memories. For instance, the controller 17 is configured to control the purge pump 13 and the purge valve 14. The controller 17 is also configured to obtain a detection result for the pressure in the intake passage IP downstream of the air cleaner AC, namely, air-cleaner downstream pressure ADP, from the pressure sensor PS1.

In the vaporized-fuel treating apparatus 1 configured as above, when a purge condition is satisfied during running of the engine ENG, the controller 17 controls the purge pump 13 and the purge valve 14 to perform the purge control.

While the purge control is being executed, the engine ENG is supplied with the air taken in the intake passage IP, the fuel injected from the fuel tank FT through an injector (not shown), and the purge gas supplied to the intake passage IP by the purge control. The controller 17 is configured to regulate an injection time of the injector and others in order to adjust the air-fuel ratio (A/F) of the engine ENG to an optimal air-fuel ratio, e.g., an ideal air-fuel ratio.

<Control for Preventing the Occurrence of A/F Disturbance>

In the present embodiment, described above, for the purpose of structural simplification of the vaporized-fuel treating apparatus 1, the purge valve 14 is constituted of a simple on-off valve. The controller 17 therefore performs the purge control by driving the purge pump 13 to place the purge valve 14 in the open state. Such a purge valve 14 is not able to perform the control of a purge flow rate (e.g., the duty control) and thus is difficult to adjust the A/F (air-fuel ratio) of the engine ENG to an optimal air-fuel ratio, e.g., an ideal air-fuel ratio. This may cause A/F disturbance, i.e., air-fuel ratio disturbance where the air-fuel ratio in the combustion chamber of the engine excessively fluctuates, resulting in deteriorated A/F control performance. In the present embodiment, therefore, the following control of the purge flow rate is performed to prevent the occurrence of A/F disturbance.

Example 1

Firstly, Example 1 is described below. In this example, the controller 17 is configured to perform the above control based on a control flow chart shown in FIG. 2.

In the following description, an actual value of the flow rate of purge gas during execution of the purge control is defined as an "actual purge flow rate APF". Further, an upper-limit value of the flow rate of purge gas to prevent the occurrence of A/F disturbance where the A/F in the combustion chamber of the engine ENG excessively fluctuates is defined as an "upper-limit purge flow rate UPF".

Figure 2:
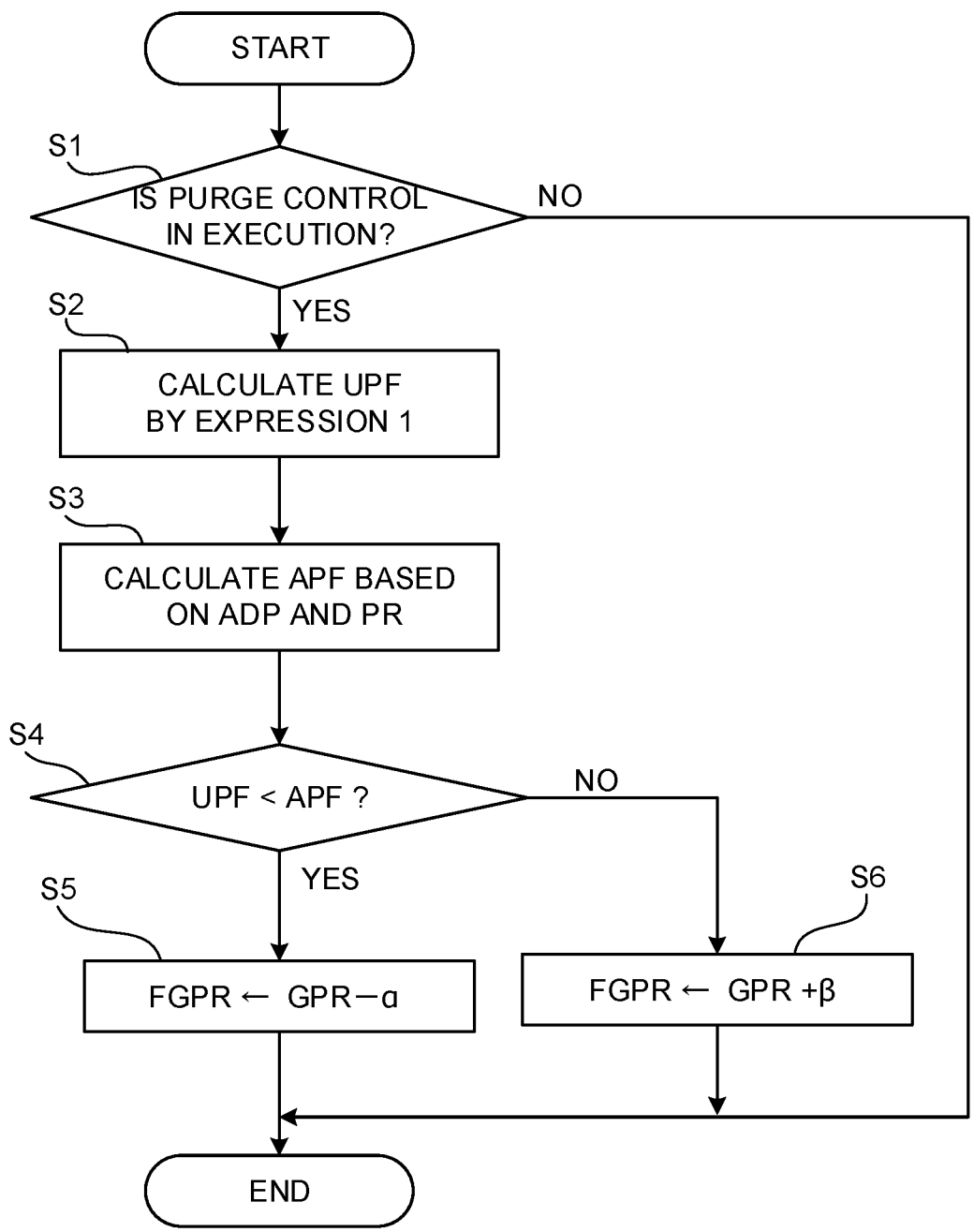
FIG. 2 is a control flow chart in Example 1 of the first embodiment.

As shown in FIG. 2, if the purge control is in execution (step S1: YES), the controller 17 calculates the upper-limit purge flow rate UPF by the following expression 1 (step S2):

$$\text{Upper-limit purge flow rate [g/sec]} = \frac{\text{Injector decreased amount [\%]} \times \text{Purge } A/F \times \text{Engine air amount [g/sec]}}{100\,[\%] \times \text{Stoichiometric } A/F} \quad \text{(Exp. 1)}$$

In this expression 1, the purge A/F indicates the concentration of purge gas, i.e., the concentration of vaporized fuel contained in the purge gas. The purge A/F is calculated based on a deviation of the A/F F/B amount, i.e., a deviation of feedback (F/B) control value of an air-fuel ratio (A/F) from the optimal air-fuel ratio. The engine air amount corresponds to an intake amount, i.e., the amount of air to be sucked into an engine. The stoichiometric ratio A/F indicates a stoichiometric air-fuel ratio, for example, 14.5 in the present embodiment. The injector decreased amount represents a decreased amount of an injection amount of an injector, namely, a fuel injection decreased amount, compared with an injection amount of the injector during non-execution of the purge control. This decreased amount is for example 40%. The controller 17 calculates the upper-limit purge flow rate UPF as above based on the injector decreased amount, the purge A/F, the engine air amount, and the stoichiometric ratio A/F.

The expression 1 is calculated by the following expressions 2 and 3:

$$\text{Purge ratio}[\%] = \frac{\text{Purge flow rate}[g/\sec]}{\text{Engine air amount}[g/\sec]} \times 100 [\%] \quad (\text{Exp. 2})$$

$$\text{Injector decreased amount}[\%] = \frac{\text{Stoichiometric } A/F}{\text{Purge } A/F} \times \text{Purge ratio}[\%] \quad (\text{Exp. 3})$$

After calculation of the upper-limit purge flow rate UPF in step S2, the controller 17 then calculates the actual purge flow rate APF based on the air-cleaner downstream pressure ADP and the pump rotation number PR (step S3). Herein, the actual purge flow rate APF is calculated for example from a map that defines a relationship between the air-cleaner downstream pressure ADP, the pump rotation number PR, and the actual purge flow rate APF. The air-cleaner downstream pressure ADP is the pressure in the intake passage IP, downstream of the air cleaner AC, and can be obtained as either a detection value of the pressure sensor PS1 or an estimated value. This air-cleaner downstream pressure ADP is also the pressure at a joining area between the purge passage 12 and the intake passage IP. The pump rotation number PR is the number of rotations of the purge pump 13.

The controller 17 subsequently compares the actual purge flow rate APF and the upper-limit purge flow rate UPF to determine whether or not the actual purge flow rate APF is higher than the upper-limit purge flow rate UPF (step S4).

If the actual purge flow rate APF is higher than the upper-limit purge flow rate UPF (step S4: YES), the controller 17 subtracts a predetermined rotation number α from a target pump rotation number GPR and sets a resultant rotation number as a final target pump rotation number FGPR (step S5). The controller 17 then controls the pump rotation number PR to the final target pump rotation number FGPR. The target pump rotation number GPR is the target number of pump rotations set in advance, for example, the rated speed of the purge pump 13. The predetermined rotation number α is for example 10 rpm in the present embodiment.

The controller 17 controls the pump rotation number PR as described above to adjust the actual purge flow rate APF to a value equal to or lower than the upper-limit purge flow rate UPF. Concretely, if the actual purge flow rate APF is higher than the upper-limit purge flow rate UPF, the controller 17 reduces the pump rotation number PR to decrease the actual purge flow rate APF to a value equal to or lower than the upper-limit purge flow rate UPF.

In contrast, if the actual purge flow rate APF is lower than the upper-limit purge flow rate UPF in step S4 (S4: NO), the controller 17 adds a predetermined rotation number β to the target pump rotation number GPR and sets a resultant rotation number as a final target pump rotation number FGPR (step S6). The controller 17 then controls the pump rotation number PR to the final target pump rotation number FGPR. The predetermined rotation number β is for example 10 rpm in the present embodiment.

The controller 17 controls the pump rotation number PR as described above to make the actual purge flow rate APF approach the upper-limit purge flow rate UPF. Concretely, when the actual purge flow rate APF is lower than the upper-limit purge flow rate UPF, the controller 17 increases the pump rotation number PR to bring the actual purge flow rate APF close to the upper-limit purge flow rate UPF.

Figure 3:
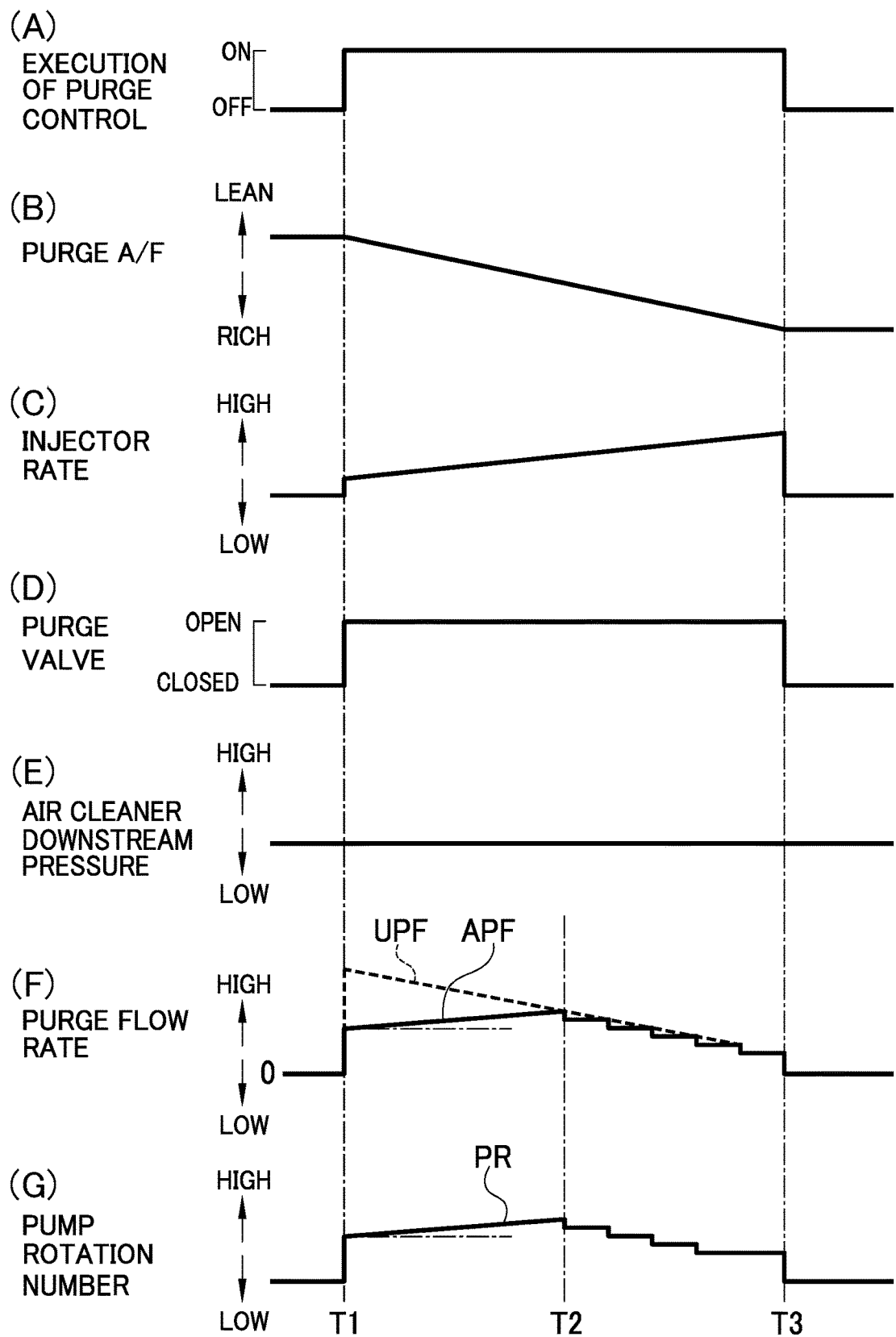
FIG. 3 is a control time chart in Example 1 of the first embodiment.

When the control is carried out based on the control flow chart shown in FIG. 2, various control values vary as plotted in a control time chart for example shown in FIG. 3. During execution of the purge control, as shown in FIG. 3, between time T1 to time T2, the actual purge flow rate APF is lower than the upper-limit purge flow rate UPF and thus the pump rotation number PR is increased so that the actual purge flow rate APF approaches the upper-limit purge flow rate UPF. Then, between time T2 to time T3, the pump rotation number PR is decreased and thus the actual purge flow rate APF lowers while remaining equal to or lower than the upper-limit purge flow rate UPF.

Example 2

Secondly, Example 2 is described below. In this example, the controller 17 is configured to perform the above control based on a control flow chart shown in FIG. 4.

Figure 4:
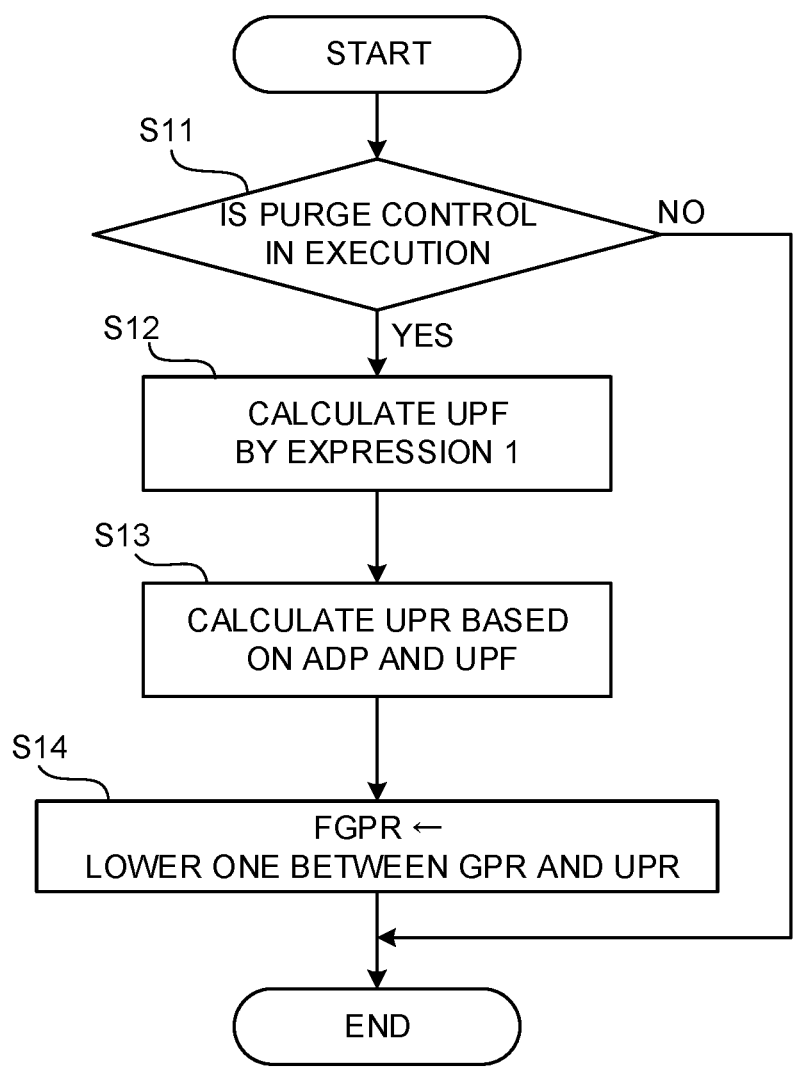
FIG. 4 is a control flow chart in Example 2 of the first embodiment.

As shown in FIG. 4, if the purge control is in execution (step S11: YES), the controller 17 calculates an upper-limit purge flow rate UPF by the same expression 1 as in Example 1 (step S12). Successively, the controller 17 calculates an upper-limit pump rotation number UPR based on the air-cleaner downstream pressure ADP and the upper-limit purge flow rate UPF (step S13). In this way, the controller 17 calculates the upper-limit pump rotation number UPR based on the upper-limit purge flow rate UPF and the air-cleaner downstream pressure ADP which also corresponds to the pressure at the joining area between the purge passage 12 and the intake passage IP.

The controller 17 then selects a lower one between the target pump rotation number GPR and the upper-limit pump rotation number UPR as the final target pump rotation number FGPR (step S14) to set this final target pump rotation number FGPR to a value equal to or lower than the upper-limit pump rotation number UPR. The controller 17 further controls the pump rotation number PR to the final target pump rotation number FGPR. In this way, the controller 17 adjusts the pump rotation number PR to a value equal to or higher than the upper-limit pump rotation number UPR.

Figure 5:
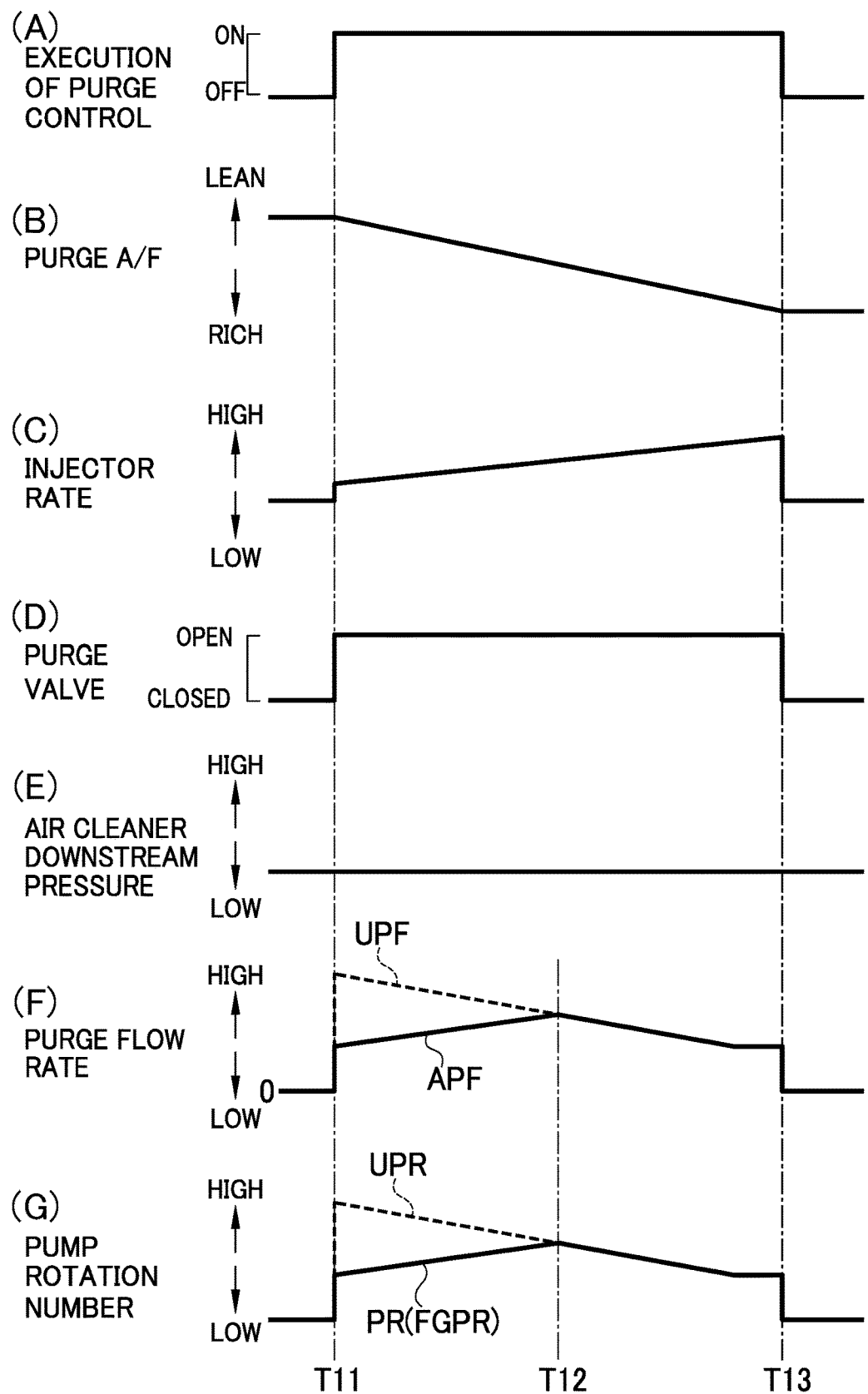
FIG. 5 is a control time chart in Example 2 of the first embodiment.

When the control is carried out based on the control flow chart shown in FIG. 4, various control values vary as plotted in a control time chart for example shown in FIG. 5. During execution of the purge control, as shown in FIG. 5, between time T11 to time T13, the pump rotation number PR is maintained at a value equal to or lower than the upper-limit pump rotation number UPR, and the actual purge flow rate APF is maintained at a value equal to or lower than the upper-limit purge flow rate UPF.

<Operations and Effects in the Present Embodiment>

In the first embodiment configured as above, the controller 17 is configured to control the pump rotation number PR during execution of the purge control to adjust the actual purge flow rate APF to a value equal to or lower than the upper-limit purge flow rate UPF.

In the present embodiment, the pump rotation number PR is controlled as above to regulate the purge flow rate. Even when the purge valve 14 is constituted of a simple on-off valve (i.e., an on-off valve having no function of regulating a flow rate) in order to simplify the structure of the vaporized-fuel treating apparatus 1 to be used in a vehicle such as a HV and a PHV, the vaporized-fuel treating apparatus 1 can control the pump rotation number PR to precisely regulate the purge flow rate, thus enabling to prevent the occurrence of A/F disturbance. Consequently, the vaporized-fuel treating apparatus 1 can be simplified in structure while suppressing A/F disturbance from occurring.

In Example 1, concretely, the controller 17 calculates the upper-limit purge flow rate UPF based on the injector decreased amount, the purge A/F, the engine air amount, and the stoichiometric ratio A/F. The controller 17 further calculates the actual purge flow rate APF based on the air-cleaner downstream pressure ADP and the pump rotation number PR. When the actual purge flow rate APF is higher than the upper-limit purge flow rate UPF, the controller 17 reduces the pump rotation number PR to decrease the actual purge flow rate APF to a value equal to or lower than the upper-limit purge flow rate UPF.

In Example 1, as described above, the pump rotation number PR is controlled based on the upper-limit purge flow rate UPF and the actual purge flow rate APF, both of which are obtained by actual calculation from various items (parameters) which may influence the A/F in the combustion chamber of the engine ENG. Therefore, the purge flow rate can be more effectively controlled with high precision to avoid the occurrence of A/F disturbance.

In Example 2, moreover, the controller 17 calculates using the expression 1 the upper-limit purge flow rate UPF based on the injector decreased amount, the purge A/F, the engine air amount, and the stoichiometric ratio A/F. The controller 17 also calculates the upper-limit pump rotation number UPR based on the air-cleaner downstream pressure ADP and the upper-limit purge flow rate UPF. The controller 17 thus controls the pump rotation number PR to a value equal to or lower than the upper-limit pump rotation number UPR.

In Example 2, as above, the pump rotation number PR is controlled to a value equal to or lower than the upper-limit pump rotation number UPR based on the upper-limit pump rotation number UPR obtained by actual calculation from various item values which may influence the A/F in the combustion chamber of the engine ENG. Therefore, the purge flow rate can be more effectively controlled with high precision to avoid the occurrence of A/F disturbance.

Second Embodiment

A second embodiment of the present disclosure will be described below, in which identical or similar parts to those in the first embodiment will be assigned the same reference signs and their details are omitted. The following description will be given with a focus on differences from the first embodiment.

<Outline of Vaporized-Fuel Treating Apparatus>

A vaporized-fuel treating system including the vaporized-fuel treating apparatus in the present embodiment is identical in structure to that in the foregoing first embodiment shown in FIG. 1. In this embodiment, however, the pressure sensor PS1 and the EGR device can be especially dispensed with.

<Control for Preventing the Occurrence of A/F Disturbance>

The purge valve 14 is a simple on-off valve as described above and is normally placed in an open state (corresponding to a 100% duty ratio) during execution of the purge, control. In the case where the purge A/F is low (i.e., rich), a method for reducing the pump rotation number PR to keep down the purge flow rate is conceivable. This method however causes the purge flow rate to lower. In the present embodiment, therefore, for addressing such a situation, the advantages of a vehicle such as a HV and a PHV are utilized; the engine rotation number ER and the engine load factor EL are increased to make an increase in the engine air amount, thereby preventing the A/F disturbance from occurring.

Figure 6:
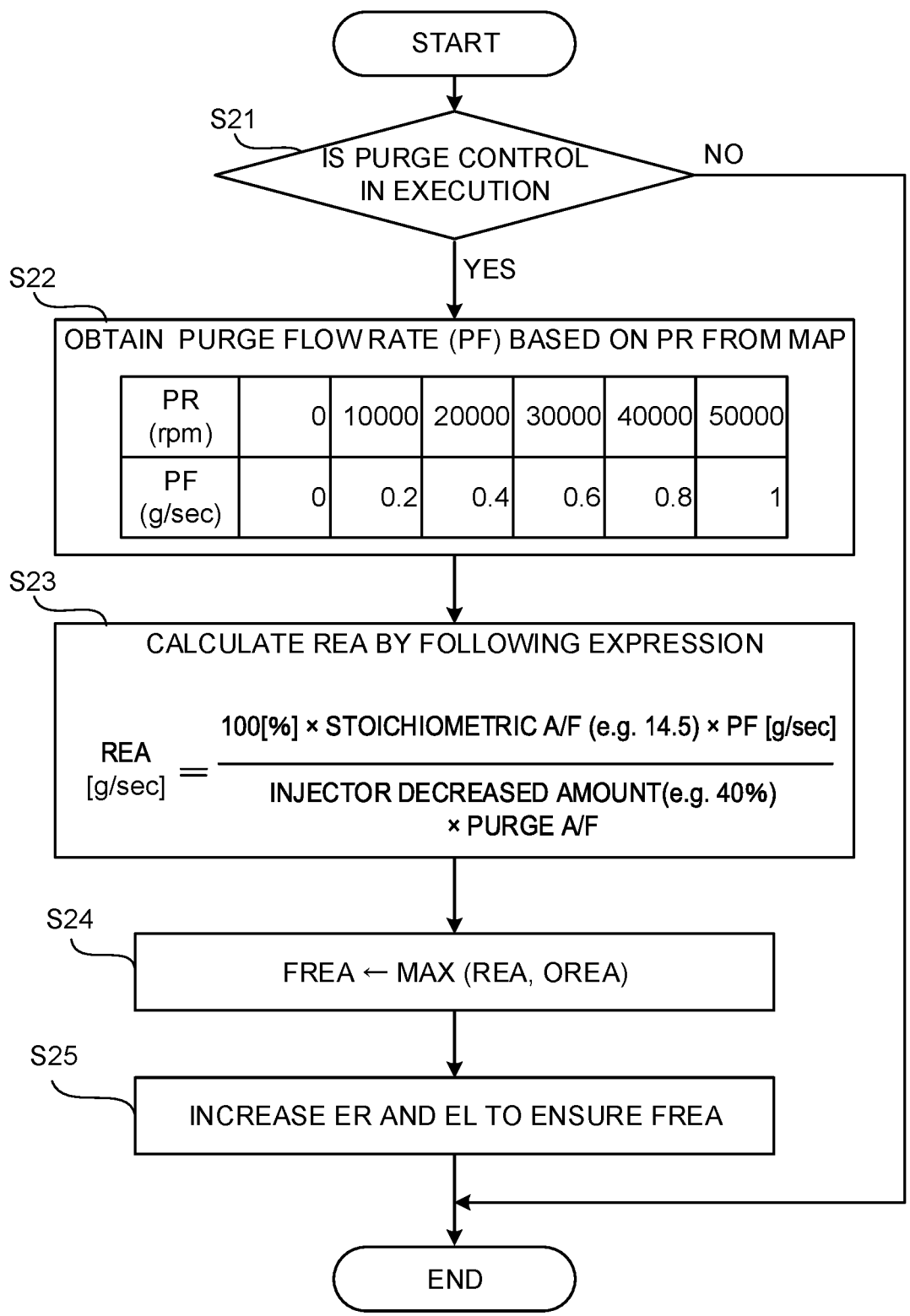
FIG. 6 is a control flow chart in a second embodiment.

In the present embodiment, therefore, the controller 17 is configured to perform the control based on a control flow chart shown in FIG. 6.

As shown in FIG. 6, if the purge control is in execution (step S21: YES), in step S22, the controller 17 obtains the purge flow rate based on the pump rotation number PR from (i.e., by use of) a map shown in FIG. 6. As an alternative, acquisition of the purge flow rate from the map may be performed by use of not only the pump rotation number PR but also a detection result for the air-cleaner downstream pressure ADP, which also may be an estimated value, of the pressure sensor PS1 in FIG. 1.

The controller 17 then calculates a request engine air amount REA (one example of a request intake amount) by the expression provided in FIG. 6 (step S23).

During execution of the purge control, the controller 17 calculates as above the request engine air amount REA based on the purge A/F. Herein, the request engine air amount REA is an engine air amount (e.g., an intake air amount) to be requested to prevent the occurrence of A/F disturbance where the A/F in the combustion chamber of the engine ENG excessively fluctuates. To be concrete, as is clear from the expression shown in FIG. 6, the request engine air amount REA is calculated based on the stoichiometric ratio A/F, the purge flow rate, and the injector decreased amount in addition to the purge A/F.

Subsequently, the controller 17 selects a maximum value between the request engine air amount REA and request engine air amounts OREA of other components, such as a battery, as a final request engine air amount FREA (step S24). The controller 17 sets the final request engine air amount FREA to a value equal to or higher than the request engine air amount REA in the above manner.

The controller 17 increases the engine rotation number ER and the engine load factor EL to ensure, the final request engine air amount FREA (step S25). In the above manner, the controller 17 controls at least one of the engine rotation number ER and the engine load factor EL to thereby adjust the engine air amount to a value equal to or higher than the request engine air amount REA. The engine load factor EL denotes a ratio of any rotation number to a maximum torque (e.g., a maximum engine load).

<Operations and Effects in the Present Embodiment>

In the second embodiment configured as above, the controller 17 is configured to calculate the request engine air amount REA based on the purge A/F during execution of the purge control. The controller 17 is further configured to control at least one of the engine rotation number ER and the engine load factor EL to adjust the engine air amount to a value equal to or higher than the request engine air amount REA.

Thus, the controller 17 controls the engine rotation number ER and the engine load factor EL according to the purge A/F to regulate the engine air amount, thereby enabling controlling the A/F in the combustion chamber of the engine to an optimal value. Therefore, even when the purge valve 14 is constituted of a simple on-off valve for simplification in structure of the vaporized-fuel treating apparatus 1 to be mounted in a vehicle such as a HV and a PHV and hence the purge flow rate could not be precisely controlled by such a purge valve 14, the A/F disturbance can be prevented from occurring. Consequently, the vaporized-fuel treating apparatus 1 can be simplified in structure while capable of preventing the occurrence of A/F disturbance.

Since the vaporized-fuel treating apparatus 1 in the present embodiment can enhance the A/F control performance without controlling the pump rotation number PR, any mechanism for controlling the pump rotation number PR can be dispensed with. With this configuration, the vaporized-fuel treating apparatus 1 can be designed with a simplified structure and also can maintain the purge flow rate at a desired level.

Moreover, the request engine air amount REA is calculated based on, besides the purge A/F, the stoichiometric ratio A/F, the purge flow rate, and the injector decreased amount.

In the present embodiment, described above, the engine air amount is controlled based on the request engine air amount REA obtained by actual calculation from various item values which may influence the A/F in the combustion chamber of the engine ENG. This configuration can more effectively prevent the occurrence of the A/F disturbance.

Third Embodiment

A third embodiment of the present disclosure will be described below, in which identical or similar parts to those in the first and second embodiments will be assigned the same reference signs and their details are omitted. The following description will be given with a focus on differences from the foregoing embodiments.
<Outline of Vaporized-Fuel Treating Apparatus>

Figure 7:
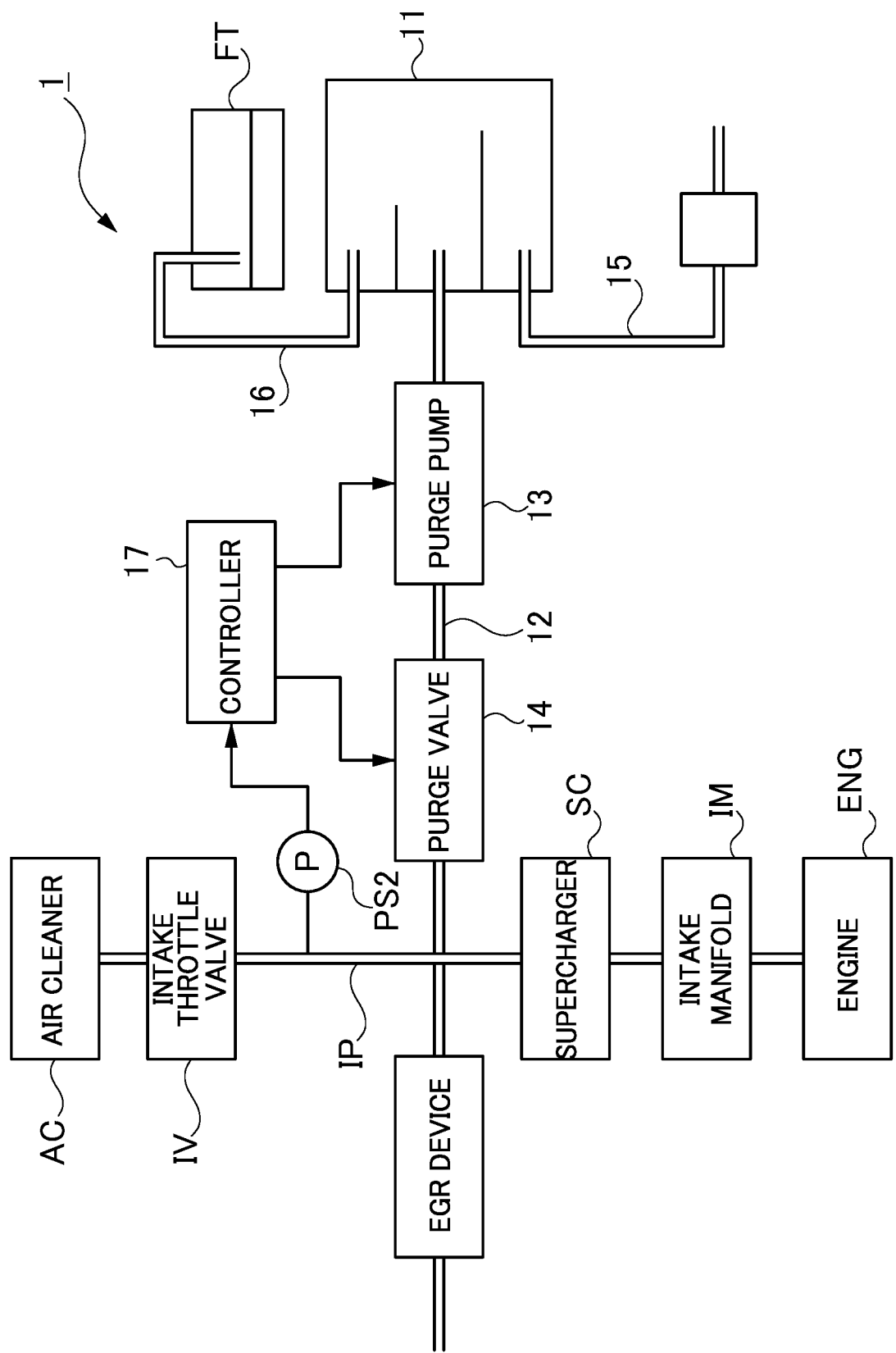
FIG. 7 is a schematic configuration diagram of a vaporized-fuel treating system including a vaporized-fuel treating apparatus in a third embodiment and its peripheral equipment.

A vaporized-fuel treating system including the vaporized-fuel treating apparatus in the present embodiment differs from those in the foregoing first embodiment shown in FIG. 1 in that an intake throttle valve IV (one example of an intake pressure control valve) configured to control the intake pressure (e.g., engine air pressure) is provided in the intake passage IP as shown in FIG. 7.

The intake throttle valve IV is a valve for controlling the intake pressure corresponding to the internal pressure of the intake passage IP. To be concrete, the intake throttle valve IV is configured to open or close at an opening degree controlled to regulate an intake-throttle-valve downstream pressure IDP (which is the pressure in the intake passage IP downstream of the intake throttle valve IV) to a negative pressure to thereby generate a differential pressure between the intake passage IP and an exhaust passage (not shown). By this generated differential pressure, the intake throttle valve IV causes a part of exhaust gas to recirculate from the exhaust passage to the intake passage IP through the EGR apparatus. The intake-throttle-valve downstream pressure IDP also denotes the pressure (the intake pressure) at a joining area between the purge passage and the intake passage IP.

In the present embodiment, in the intake passage IP, a pressure sensor PS2 (a pressure detecting part, a second pressure detecting part) is provided downstream of the intake throttle valve IV, that is, at a position between the intake throttle valve IV and a joining area of the intake passage IP to the purge passage 12. The controller 17 obtains a detection result for the intake-throttle-valve downstream pressure IDP from the pressure sensor PS2.

<Control for Preventing the Occurrence of A/F Disturbance>

In the present embodiment in which the purge valve 14 is constituted of a simple on-off valve as in the first and second embodiments, the vaporized-fuel treating apparatus 1 is configured to control the purge flow rate in the following manner in order to prevent the occurrence of A/F disturbance.

Example 1

Firstly, Example 1 is described below. In this example, the controller 17 is configured to perform the above control based on a control flow chart shown in FIG. 8.

Figure 8:
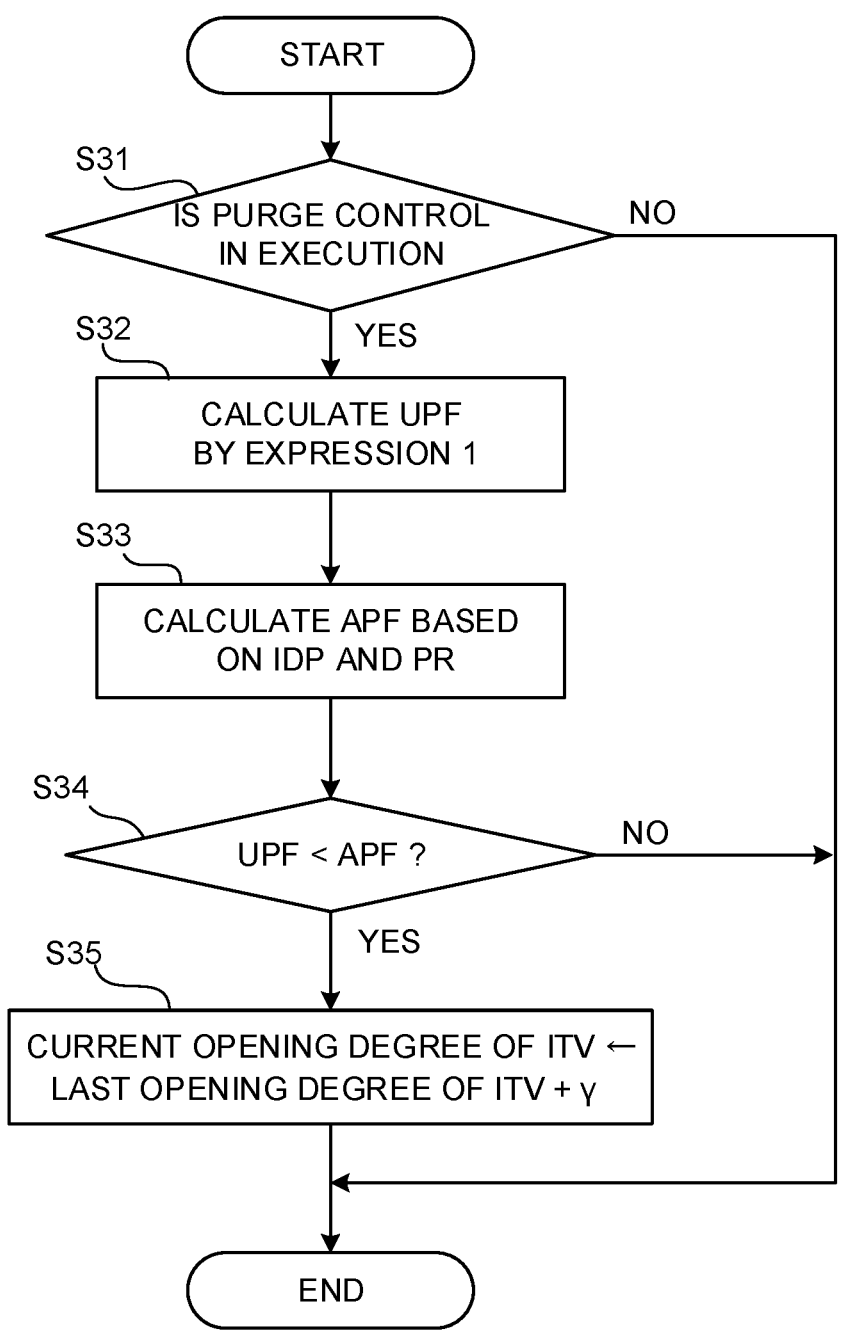
FIG. 8 is a control flow chart in Example 1 of the third embodiment.

As shown in FIG. 8, if the purge control is in execution (step S31: YES), the controller 17 calculates the upper-limit purge flow rate UPF by the foregoing expression 1 (step S32).

The controller 17 then calculates the actual purge flow rate APF based on the intake-throttle-valve downstream pressure IPD and the pump rotation number PR (step S33). The actual purge flow rate APF is calculated for example from a map that defines a relationship between the intake-throttle-valve downstream pressure IDP, the pump rotation number PR, and the actual purge flow rate APF. The intake-throttle-valve downstream pressure IDP is the pressure (i.e., the intake pressure) in the intake passage IP, downstream of the intake throttle valve IV, and can be obtained as either a detection value of the pressure sensor PS2 or an estimated value.

Subsequently, the controller 17 compares the actual purge flow rate APF and the upper-limit purge flow rate UPF to determine whether or not the actual purge flow rate APF is higher than the upper-limit purge flow rate UPF (step S34).

If the actual purge flow rate APF is higher than the upper-limit purge flow rate UPF (step S34: YES), the controller 17 adds a predetermined opening degree γ (e.g., 1°) to a last opening degree of the intake throttle valve IV and sets a resultant opening degree as a current opening degree of the intake throttle valve IV (step S35). As the opening degree of the intake throttle valve IV increases as above, the intake-throttle-valve downstream pressure IDP also rises (that is, the negative pressure becomes lower), the purge flow rate decreases.

The controller 17 controls the opening degree of the intake throttle valve IV to adjust the actual purge flow rate APF to a value equal to or lower than the upper-limit purge flow rate UPF during execution of the purge control. To be concrete, if the actual purge flow rate APF is higher than the upper-limit purge flow rate UPF, the controller 17 increases the opening degree of the intake throttle valve IV to increase the intake-throttle-valve downstream pressure IDP, thereby reducing the actual purge flow rate APF to a value equal to or lower than the upper-limit purge flow rate UPF.

Figure 9:
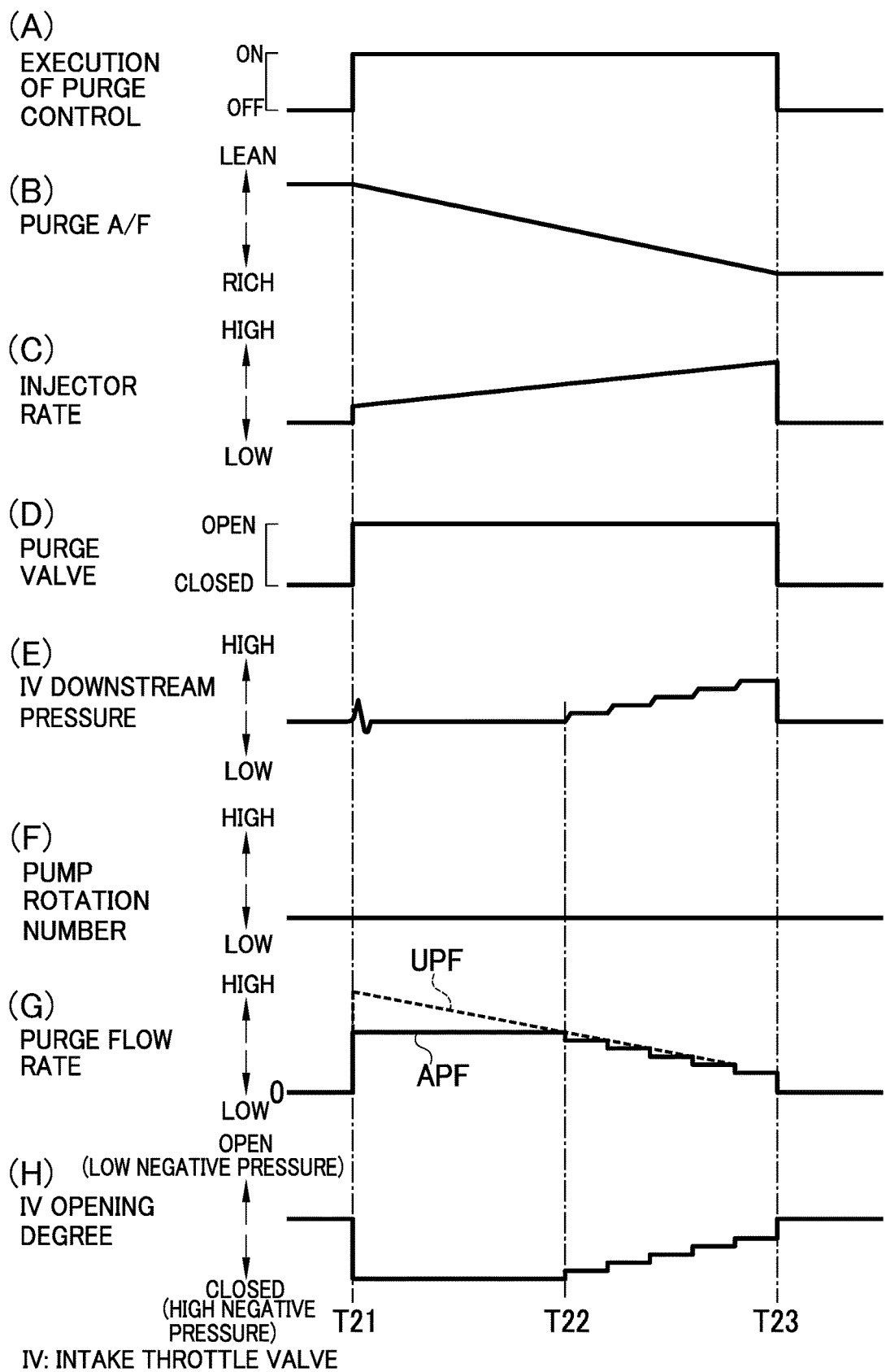
FIG. 9 is a control time chart in Example 1 of the third embodiment.

When the control based on the control flow chart shown in FIG. 8 is performed, various control values vary as plotted in a control time chart for example shown in FIG. 9. During execution of the purge control, as shown in FIG. 9, between time T22 to T23, the opening degree of the intake throttle valve IV is increased to increase the intake-throttle-valve downstream pressure IDP, so that the actual purge flow rate APF lowers and is maintained at a level equal to or lower than the upper-limit purge flow rate UPF. The intake-throttle-valve downstream pressure IDP is for example −5 kPa between time T21 to time T22. The pump rotation number PR is for example 30000 rpm in the present embodiment.

Example 2

Secondly, Example 2 is described below. In this example, the controller 17 is configured to perform the above control based on a control flow chart shown in FIG. 10.

Figure 10:
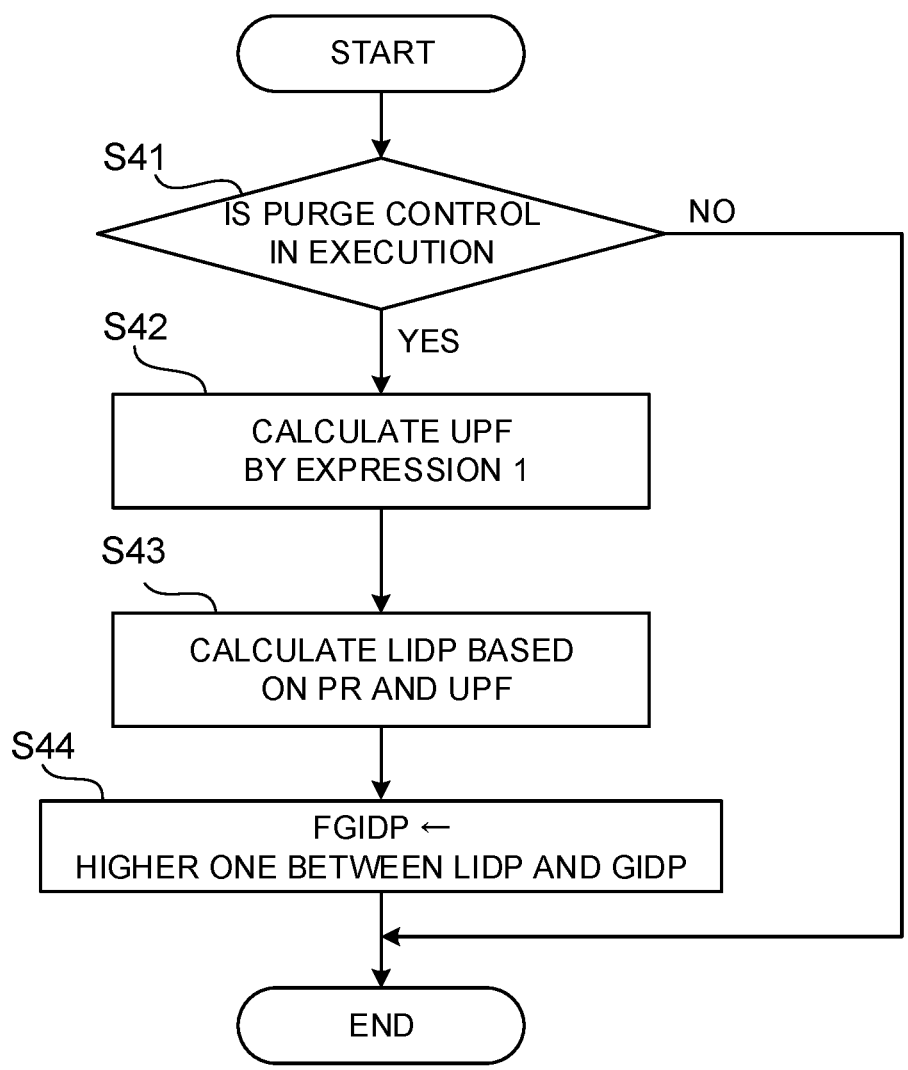
FIG. 10 is a control flow chart in Example 2 of the third embodiment.

As shown in FIG. 10, if the purge control is in execution (step S41: YES), the controller 17 calculates the upper-limit purge flow rate UPF by the same expression 1 as in Example 1 (step S42). The controller 17 successively calculates a lower-limit intake-throttle-valve downstream pressure LIDP (one example of a lower-limit intake pressure) based on the pump rotation number PR and the upper-limit purge flow rate UPF (step S43).

The controller 17 then selects a higher one between the lower-limit intake-throttle-valve downstream pressure LIDP and a target intake-throttle-valve downstream pressure GIDP, as a final target intake-throttle-valve downstream pressure FGIDP (step S44). Accordingly, the final target intake-throttle-valve downstream pressure FGIDP is set to be equal to or higher than the lower-limit intake-throttle-valve downstream pressure LIDP. The controller 17 thus controls the opening degree of the intake throttle valve IV to adjust the intake-throttle-valve downstream pressure IDP to the final target intake-throttle-valve downstream pressure FGIDP. In the above manner, the controller 17 controls the opening degree of the intake throttle valve IV to adjust the intake-throttle-valve downstream pressure IDP to a value equal to or higher than the lower-limit intake-throttle-valve downstream pressure LIDP.

Figure 11:
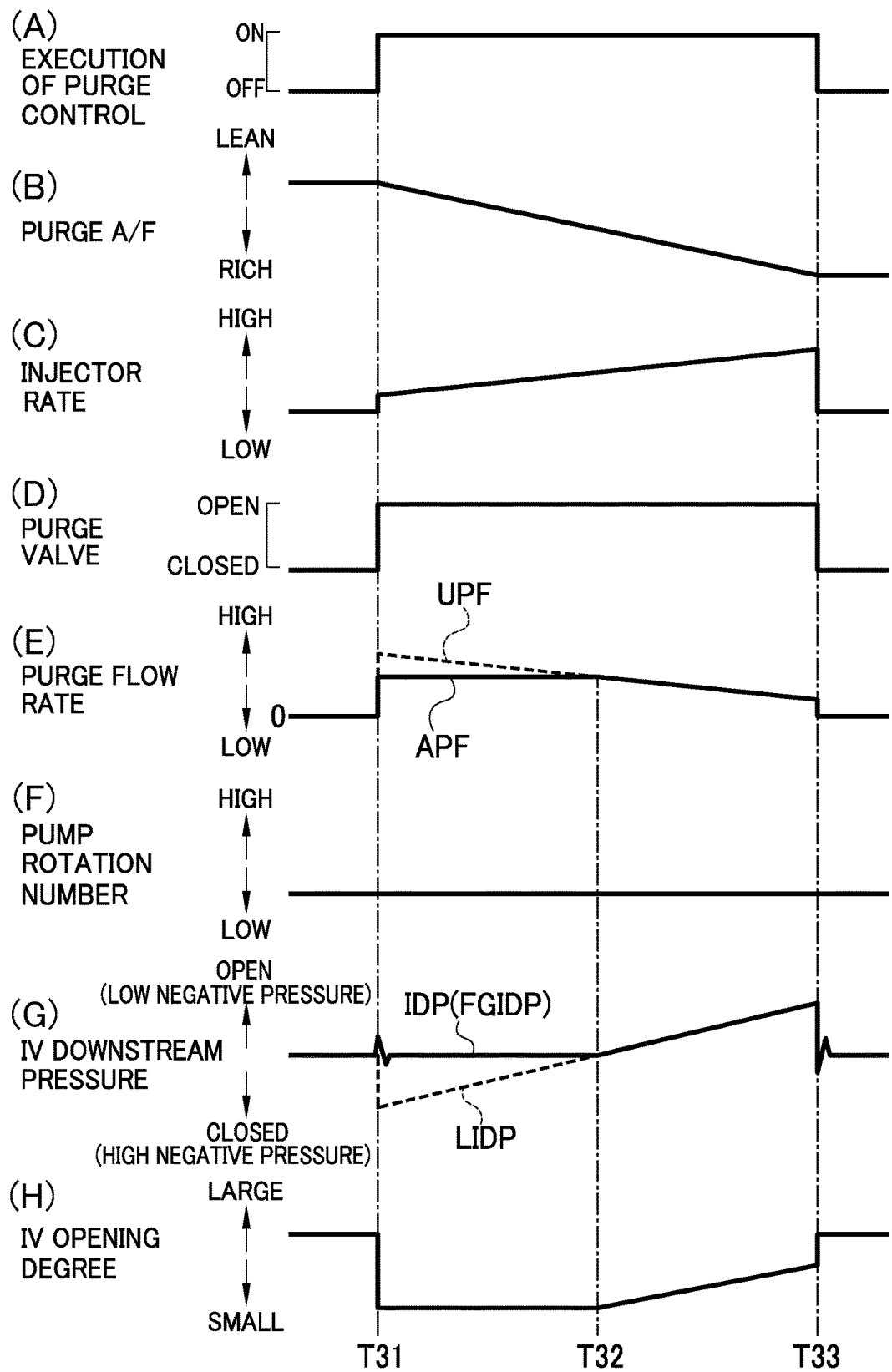
FIG. 11 is a control time chart in Example 2 of the third embodiment.

When the above control is carried out based on the control flow chart shown in FIG. 10, various control values vary as plotted in a control time chart for example shown in FIG. 11.

During execution of the purge control, as shown in FIG. 11, between time T31 to time T33, the intake-throttle-valve downstream pressure IDP is maintained at a level equal to or higher than the lower-limit intake-throttle-valve downstream pressure LIDP and the actual purge flow rate APF is maintained at a level equal to or lower than the upper-limit purge flow rate UPF. The pump rotation number PR is for example 30000 rpm.

<Operations and Effects in the Present Embodiment>

In the third embodiment configured as above, the controller 17 is configured to control the opening degree of the intake throttle valve IV during execution of the purge control to adjust the actual purge flow rate APF to a value equal to or lower than the upper-limit purge flow rate UPF.

In the present embodiment, as above, the opening degree of the intake throttle valve IV is controlled to adjust the intake-throttle-valve downstream pressure IDP to thereby regulate the purge flow rate. Therefore, even when the purge valve 14 is constituted of a simple on-off valve for simplification in structure of the vaporized-fuel treating apparatus 1 to be mounted in a vehicle such as a HV and a PHV, the vaporized-fuel treating apparatus 1 can control the opening degree of the intake throttle valve IV to enable to precisely control the purge flow rate and thus prevent the occurrence of the A/F disturbance. Consequently, the vaporized-fuel treating apparatus 1 can be simplified in structure while capable of preventing the occurrence of A/F disturbance.

Since the vaporized-fuel treating apparatus 1 in the present embodiment can control the purge flow rate by utilizing the intake throttle valve IV, any mechanism for controlling the pump rotation number PR can be dispensed with. With this configuration, the vaporized-fuel treating apparatus 1 can be designed with a simplified structure.

Therefore, concretely, in Example 1, the controller 17 calculates the upper-limit purge flow rate UPF by using the foregoing expression 1 based on the injector decreased amount, the purge A/F, the engine air amount, and the stoichiometric ratio A/F. Furthermore, the controller 17 calculates the actual purge flow rate APF based on the intake-throttle-valve downstream pressure IDP and the pump rotation number PR. When the actual purge flow rate APF is higher than the upper-limit purge flow rate UPF, the controller 17 increases the opening degree of the intake throttle valve IV to increase the intake-throttle-valve downstream pressure IDP, thereby decreasing the actual purge flow rate APF to a value equal to or lower than the upper-limit purge flow rate UPF.

In the present Example, described above, the controller 17 controls the opening degree of the intake throttle valve IV (by extension, the intake-throttle-valve downstream pressure IDP) based on the upper-limit purge flow rate UPF and the actual purge flow rate APF, both of which are obtained by actual calculation based on various item values which may influence the A/F in the combustion chamber of the engine ENG. Accordingly, the vaporized-fuel treating apparatus 1 can more effectively make a precise control of the purge flow rate and prevent the A/F disturbance from occurring.

In Example 2, the controller 17 calculates the upper-limit purge flow rate UPF based on the injector decreased amount, the purge A/F, the engine air amount, and the stoichiometric ratio A/F by use of the expression 1. Furthermore, the controller 17 calculates the lower-limit intake-throttle-valve downstream pressure LIDP based on the pump rotation number PR and the upper-limit purge flow rate UPF. The controller 17 also controls the intake-throttle-valve downstream pressure IDP to a value equal to or higher than the lower-limit intake-throttle-valve downstream pressure LIDP.

In this example, as above, the intake-throttle-valve downstream pressure IDP is controlled to a value equal to or higher than the lower-limit intake-throttle-valve downstream pressure LIDP based on the lower-limit intake-throttle-valve downstream pressure LIDP obtained by actual calculation from various item values which may influence the A/F in the combustion chamber of the engine ENG. Accordingly, the vaporized-fuel treating apparatus 1 can more effectively make a precise control of the purge flow rate and prevent the A/F disturbance from occurring.

Fourth Embodiment

An embodiment of the present disclosure will be described below, in which identical or similar parts to those in the first to third embodiments will be assigned the same reference signs and their details are omitted. The following description will be given with a focus on differences from the foregoing embodiments.

<Control for Preventing the Occurrence of A/F Disturbance at the Start of Purge Control>

In the vaporized-fuel treating apparatus 1 in each of the first to third embodiments, the purge valve 14 is a simple on-off valve. This configuration may cause a possibility that fine or precise A/F control performance could not be realized at the start of the purge control, i.e., at the time of changeover from purge OFF to ON. In the present embodiment, therefore, at the start of the purge control, the pump rotation number PR is maintained at a low rotation level for a while and thereafter the pump rotation number PR is increased.

Figure 12:
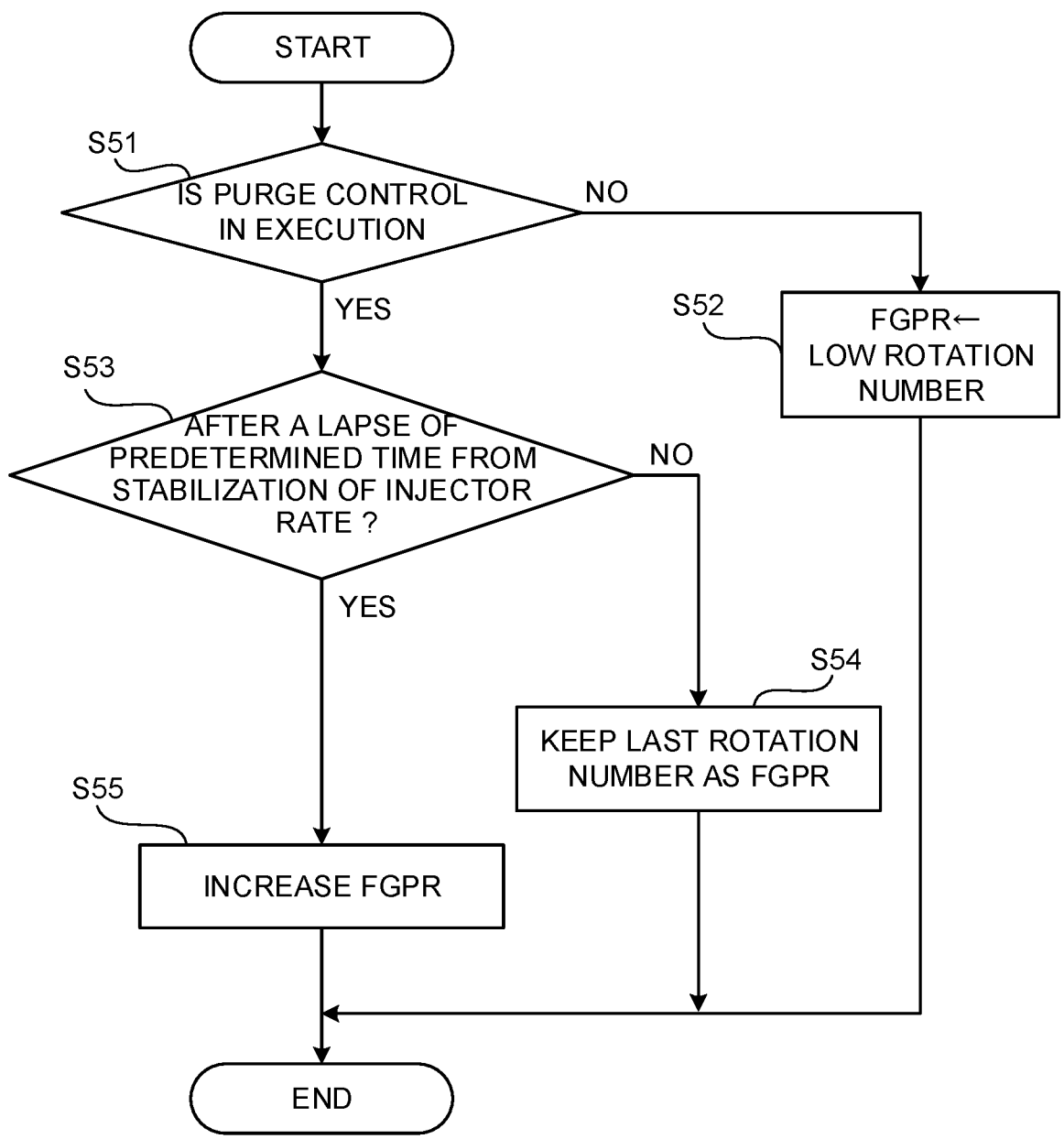
FIG. 12 is a control flow chart in a fourth embodiment.

In the present embodiment, for this operation, the controller 17 is configured to perform the control based on the control flow chart shown in FIG. 12.

As shown in FIG. 12, if the purge control is not in execution (step S51: NO), that is, before the purge control starts to be executed, the controller 17 sets in advance the final target pump rotation number FGPR to a low rotation number (e.g., a low rotation number lower than the rated speed of the purge pump 13) (step S52). In contrast, if the purge control is in execution (step S51: YES), that is, if the purge control has started being executed, before a predetermined time period (e.g., 1 sec) elapses from when the injector rate (or injection rate) stabilizes (step S53; NO), the controller 17 keeps the last rotation number as the final target pump rotation number FGPR (step S54). Specifically, in step S54, the controller 17 maintains the final target pump rotation number FGPR at the low rotation number. Thereafter, if the predetermined time is elapsed from when the injector rate stabilizes (step S53: YES), the controller 17 increases the final target pump rotation number FGPR (step S55). The injector rate is an equivalent term to the foregoing injector decreased amount.

In step S53, the controller 17 may configured to determine whether or not the predetermined time (e.g., 1 sec) is elapsed from when the A/F F/B amount stabilizes (e.g., within ±2%). This A/F F/B amount represents an air-fuel ratio feedback control value, that is, a control value to bring an air-fuel ratio in the combustion chamber of the engine ENG close to a target air-fuel ratio.

The predetermined time in step S53 may be determined according to the purge A/F from a map, i.e., by use of a map. One example of the map to be used herein is shown in FIG. 13.

As another alternative, the predetermined time in step S53 may be determined according to the last purge stop time from a map, i.e., by use of a map. One example of the map to be used herein is shown in FIG. 14.

Figure 15:
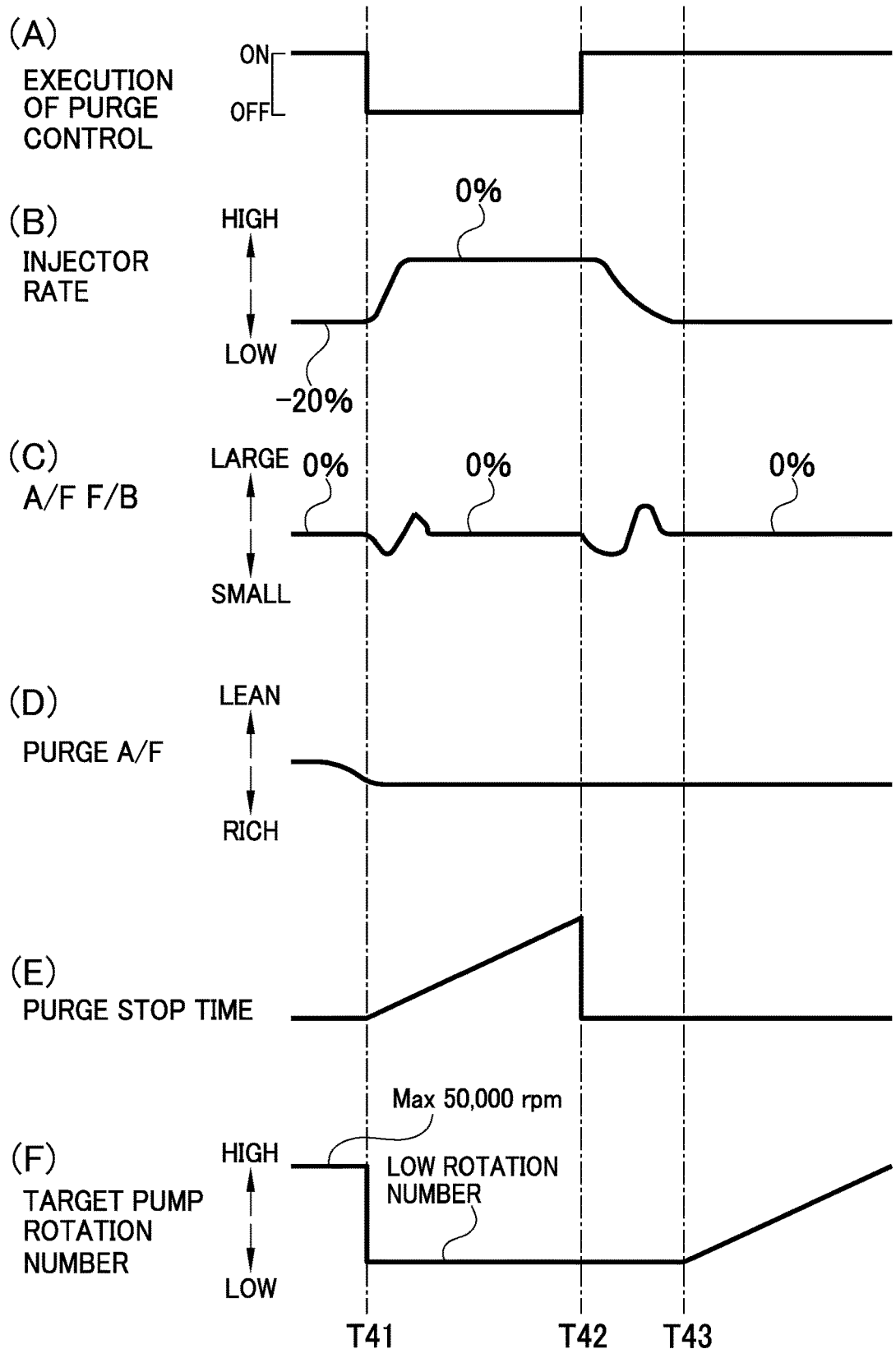
FIG. 15 is a control time chart in the fourth embodiment.

The above control is carried out based on a control time chart, various control values vary as plotted in a control time chart for example shown in FIG. 15. Between time T41 to time T42, the purge control is not executed as shown in FIG. 15, the pump rotation number PR is a low rotation number (e.g., 10000 rpm). Thereafter, the purge control starts to be executed at time T42. However, the injector rate and the A/F F/B amount are not stable between time T42 to time T43 and therefore the pump rotation number PR is maintained at the low rotation number. At time 43 and subsequent, when the injector rate and the A/F F/B amount stabilize, the pump rotation number PR is then gradually increased.

<Operations and Effects in the Present Embodiment>

In the fourth embodiment described above, at the start of the purge control, the controller 17 keeps the pump rotation number PR at a low rotation number lower than the rated speed and thereafter increases the pump rotation number PR after a lapse of the predetermined time.

At the start (OFF→ON) of the purge control, that is, when the purge valve 14 is placed in an open state, a large amount of purge gas (i.e., gas containing vaporized fuel) is not supplied at once to the engine ENG. Thus, the occurrence of the A/F disturbance can be prevented. Consequently, even when the purge valve 14 is a simple on-off valve, the fine or precise A/F control performance can be realized at the start of the purge control.

The foregoing embodiments are mere examples and give no limitation to the present disclosure. The present disclosure may be embodied in other specific forms without departing from the essential characteristics thereof.

REFERENCE SIGNS LIST

1 Vaporized fuel treating apparatus
11 Canister
12 Purge passage
13 Purge pump
14 Purge valve
15 Atmosphere passage
16 Vapor passage
17 Controller
ENG Engine
IP Intake passage
AC Air cleaner
SC Supercharger
IM Intake manifold
PS1 Pressure sensor
FT Fuel tank
ADP Air-cleaner downstream pressure
UPF Upper-limit purge flow rate
PR Pump rotation number
APF Actual purge flow rate
GPR Target pump rotation number
α Predetermined rotation number
β Predetermined rotation number
FGPR Final target pump rotation number
UPR Upper-limit pump rotation number
REA Request engine air amount
OREA Request engine air amount of other components
FREA Final request engine air amount
ER Engine rotation number
EL Engine road factor
IV Intake throttle valve
PS2 Pressure sensor
IDP Intake-throttle-valve downstream pressure
γ Predetermined opening degree
LIDP Lower-limit intake-throttle-valve downstream pressure
GIDP Target intake-throttle-valve downstream pressure
FGIDP Final target intake-throttle-valve downstream pressure

What is claimed is:

1. A vaporized-fuel treating apparatus to be used in a vehicle configured to obtain driving power for running from an internal combustion engine and a motor, the vaporized-fuel treating apparatus comprising:
a canister configured to store vaporized fuel;
a purge passage connected to an intake passage and the canister, the intake passage being connected to the internal combustion engine;
a purge pump provided in the purge passage;
a purge valve configured to open and close the purge passage; and
a controller configured to
perform purge control in which the purge valve is placed in an open state while the purge pump is being driven to introduce purge gas containing the vaporized fuel from the canister to the intake passage through the purge passage, and
during execution of the purge control, control a rotation number of the purge pump to adjust an actual purge flow rate to a value equal to or lower than an upper-limit purge flow rate, wherein the actual purge flow rate is defined as an actual value of a flow rate of the purge gas during execution of the purge control, and the upper-limit purge flow rate is defined as an upper-limit value of the flow rate of the purge gas to prevent occurrence of air-fuel ratio disturbance where an air-fuel ratio in a combustion chamber of the internal combustion engine excessively fluctuates.

2. The vaporized-fuel treating apparatus according to claim 1, wherein the internal combustion engine includes a fuel injection valve configured to inject fuel into the combustion chamber of the internal combustion engine, and the controller is configured to:
(i) calculate the upper-limit purge flow rate based on a fuel injection decreased amount corresponding to a decreased amount of an injection amount of the fuel injection valve in comparison with an injection amount during non-execution of the purge control, a concentration of the purge gas, an intake amount, and a stoichiometric air-fuel ratio;
(ii) calculate the actual purge flow rate based on a pressure in a joining area of the purge passage to the intake passage and the rotation number of the purge pump; and
(iii) when the actual purge flow rate is higher than the upper-limit purge flow rate, reduce the rotation number of the purge pump to decrease the actual purge flow rate to a value equal to or lower than the upper-limit purge flow rate.

3. The vaporized-fuel treating apparatus according to claim 1, wherein the internal combustion engine includes a fuel injection valve configured to inject fuel into the combustion chamber of the internal combustion engine, and the controller is configured to:
(i) calculate the upper-limit purge flow rate based on a fuel injection decreased amount corresponding to a decreased amount of an injection amount of the fuel injection valve in comparison with an injection amount during non-execution of the purge control, a concentration of the purge gas, an intake amount, and a stoichiometric air-fuel ratio;
(ii) calculate an upper-limit pump rotation number based on a pressure in a joining area of the purge passage to the intake passage and the upper-limit purge flow rate; and
(iii) control the rotation number of the purge pump to a value equal to or lower than the upper-limit pump rotation number.

4. The vaporized-fuel treating apparatus according to claim 1, wherein the controller is configured to keep the rotation number of the purge pump at a low rotation number lower than a rated speed of the purge pump at start of the purge control and, after a lapse of a predetermined time, gradually increase the rotation number of the purge pump.

* * * * *